(12) United States Patent
Wagener

(10) Patent No.: US 6,506,068 B2
(45) Date of Patent: Jan. 14, 2003

(54) KIT FOR A BUS BAR SYSTEM FOR CONNECTING BUS BARS WITH CONNECTORS OF AN ELECTRIC INSTALLATION DEVICE

(75) Inventor: Hans Wagener, Dietzhölztal (DE)

(73) Assignee: Rittal Rudolf Loh GmbH & Co. KG, Herborn (DE)

( * ) Notice: Subject to any disclaimer, the term of this patent is extended or adjusted under 35 U.S.C. 154(b) by 3 days.

(21) Appl. No.: 09/761,098

(22) Filed: Jan. 16, 2001

(65) Prior Publication Data

US 2001/0027872 A1 Oct. 11, 2001

(30) Foreign Application Priority Data

Jan. 15, 2000 (DE) .......................................... 100 01 462

(51) Int. Cl.$^7$ ................................................ H01R 4/60
(52) U.S. Cl. ...................................... 439/213; 174/886
(58) Field of Search ................................ 439/212, 213; 361/775, 624, 637; 174/70 B, 71 B, 72 B, 88 B, 99 B, 17 F, 149 B

(56) References Cited

U.S. PATENT DOCUMENTS

| | | | | | |
|---|---|---|---|---|---|
| 1,840,887 | A | * | 1/1932 | De Mask | 174/129 B |
| 2,997,627 | A | * | 8/1961 | Ellegood | 174/88 B |
| 3,213,183 | A | * | 10/1965 | Weimer et al. | 174/33 |
| 4,204,085 | A | * | 5/1980 | Chapman et al. | 174/13 |
| 5,949,641 | A | * | 9/1999 | Walker et al. | 174/70 B |
| 6,141,206 | A | * | 10/2000 | Bruner et al. | 174/71 B |

* cited by examiner

Primary Examiner—Neil Abrams
Assistant Examiner—Phuong KT Dinh
(74) Attorney, Agent, or Firm—Pauley Petersen Kinne & Erickson

(57) ABSTRACT

A kit for a bus bar system for connecting bus bars with connectors of an electric installation device, which avoids the production of special connecting rails, depending on the position of the connecting planes of the bus bars and the connectors of the installation device.

18 Claims, 2 Drawing Sheets

KIT FOR A BUS BAR SYSTEM FOR CONNECTING BUS BARS WITH CONNECTORS OF AN ELECTRIC INSTALLATION DEVICE

BACKGROUND OF THE INVENTION

1. Field of the Invention

This invention relates to a kit for a bus bar system for connecting bus bars with the connectors of an electric installation device.

2. Description of Related Art

In the field of switchgear cabinet production, connecting rails, which are bent from a flat material and/or beveled and which must be particularly matched to the installation locations of these elements, are used for connecting bus bars of the bus bar system with the connectors of the installation device. To worsen matters, the bus bars and the connectors of the installation device are arranged in planes which extend perpendicular with respect to each other and, depending on the installation possibilities in the switchgear cabinet, their planes can be differently offset horizontally and vertically with respect to each other. Further problems arise when it is necessary to transmit particularly high currents via the connections. This requires large cross sections of the connecting rails, which often can only be matched to the installation situation at the site after the bus bars and the installation devices are installed.

SUMMARY OF THE INVENTION

It is one object of this invention to provide a kit for a bus bar system of the type mentioned above but with which even connecting rails for high currents can be combined, which can be adapted to different current strengths and different installation situations.

In accordance with this invention, this object is achieved with a kit that includes connecting elbows, flat rail sections and Z-shaped angle cleats made from a flat material of uniform cross section. The connecting elbows have connecting legs and junction legs, which can be connected with the bus bar, wherein in an installed position of the connecting elbow the connecting legs rest on top of each other and the junction legs are at a distance from each other, which corresponds to the thickness of the flat material. In the installed position of the angle cleat sets of a junction leg the Z-shaped angle cleats have a distance from each other, which corresponds to a thickness of the flat material.

Here, the connection can be made, depending on the current strength, by one or several connecting elbows, flat rail sections and/or Z-shaped angle cleats. In one embodiment, the kit comprises an equal number of connecting elbows, flat rail sections and/or Z-shaped angle cleats.

It is possible with the connecting elbows, flat rail sections and/or Z-shaped angle cleats to take the installation planes of the bus bars and the connectors of the installation device into account without the use of specially produced connecting rails for the connections. It is within the scope of this invention to use differently embodied connecting elbows in place of the flat rail sections and/or the Z-shaped angle cleats, or to make available flat rail sections of different lengths and/or Z-shaped angle cleats with center legs of different length.

These variations can be employed in particular if, in connection with a multi-phase bus bar system the connecting elbows for a bus bar system with several, spaced apart bus bars have connecting legs of different lengths matched to the distance between the bus bars and with connecting bores associated with the bus bars. The supply of different connecting elbows in the kit can be avoided because with bus bar systems having several spaced apart bus bars, for connecting each bus bar, uniform connecting elbows are used, with connecting legs that extend transversely over all bus bars and have associated connecting bores in the area of each bus bar. However, the connecting legs of a connecting elbow set can be connected with the associated bus bar via insulating pieces, which receive a contact bow only in the area of the associated bus bar, which makes the electrical connection between the bus bar and the connecting elbow set.

The individual parts of a connection between a bus bar and a connector of an installation device can be simply connected with each other because the connecting legs of the connecting elbow sets of the flat rail sections and the junction legs of the angle cleat sets have fastening bores, which are matched to each other.

In one embodiment, the angle cleat sets uniformly have Z-shaped angle cleats, with a center leg having additional connecting receivers for fixing the angle cleat which is set in place in the installed position, and the Z-shaped angle cleats selected for a connection can be combined into a fixed angle cleat set, in which the junction legs maintain a defined position.

If the installation device has a flat junction contact, it can be connected with a good electrical contact with the spaced apart junction legs of a connection elbow set or an angle cleat set because contact plates have unused distances between the angle cleats of the angle cleat set, whose thickness corresponds to the thickness of the flat material and which can be connected with the junction legs. The flat junction contact of the installation device is in flat contact with all connecting legs.

BRIEF DESCRIPTION OF THE DRAWINGS

This invention is explained in greater detail in view of an embodiment represented in the drawings, wherein.

DESCRIPTION OF PREFERRED EMBODIMENTS

Figure 1:
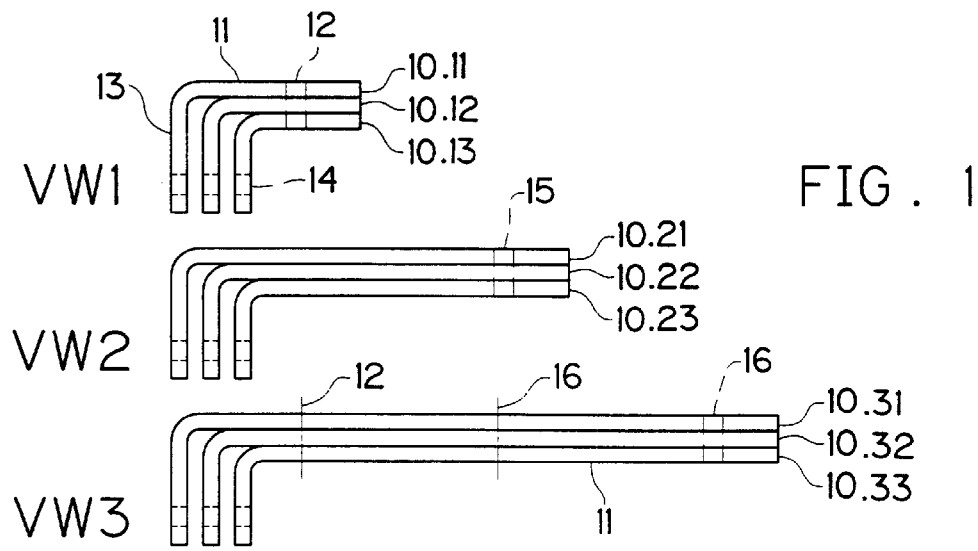
FIG. 1 is a side view of three different connecting elbow sets with respectively three connecting elbows, but with connecting legs of different lengths.
Figure 2:
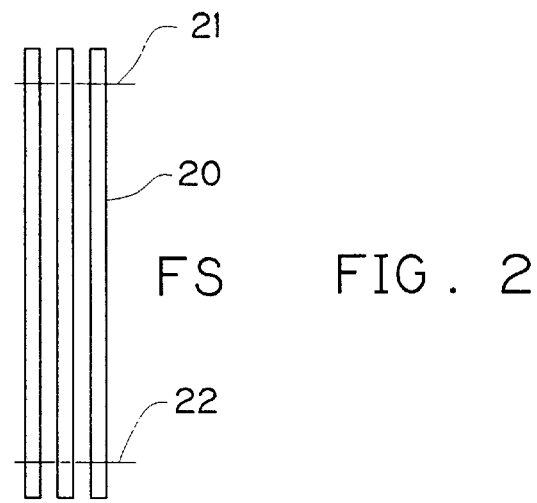
FIG. 2 is a side view of a flat rail set with three flat rail sections.
Figure 3:
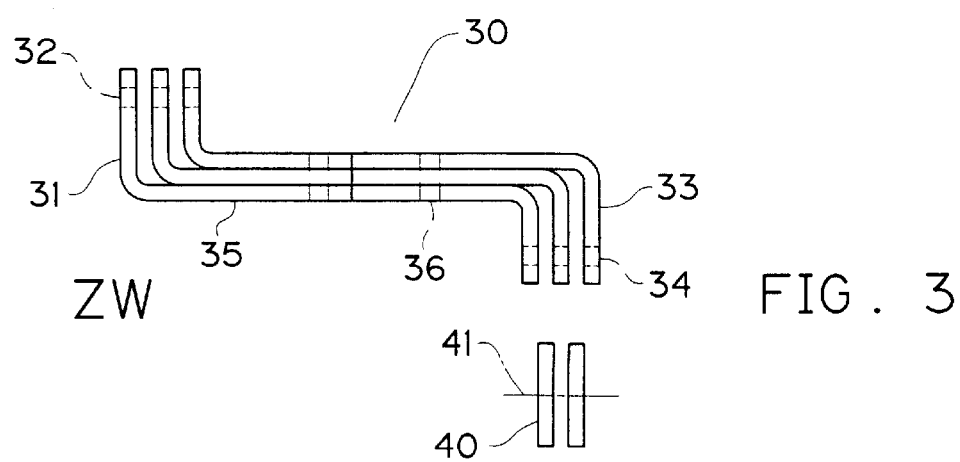
FIG. 3 is a side view of an angle cleat set with three Z-shaped angle cleats.

As FIGS. 1 to 3 show, all connecting elements are made of a flat material of a uniform cross section. Depending on the maximum current strength to be transmitted, a more or less large number of individual parts can be used. This invention will be explained in view of respectively three combined individual elements, which are called individual element sets.

Figure 4:
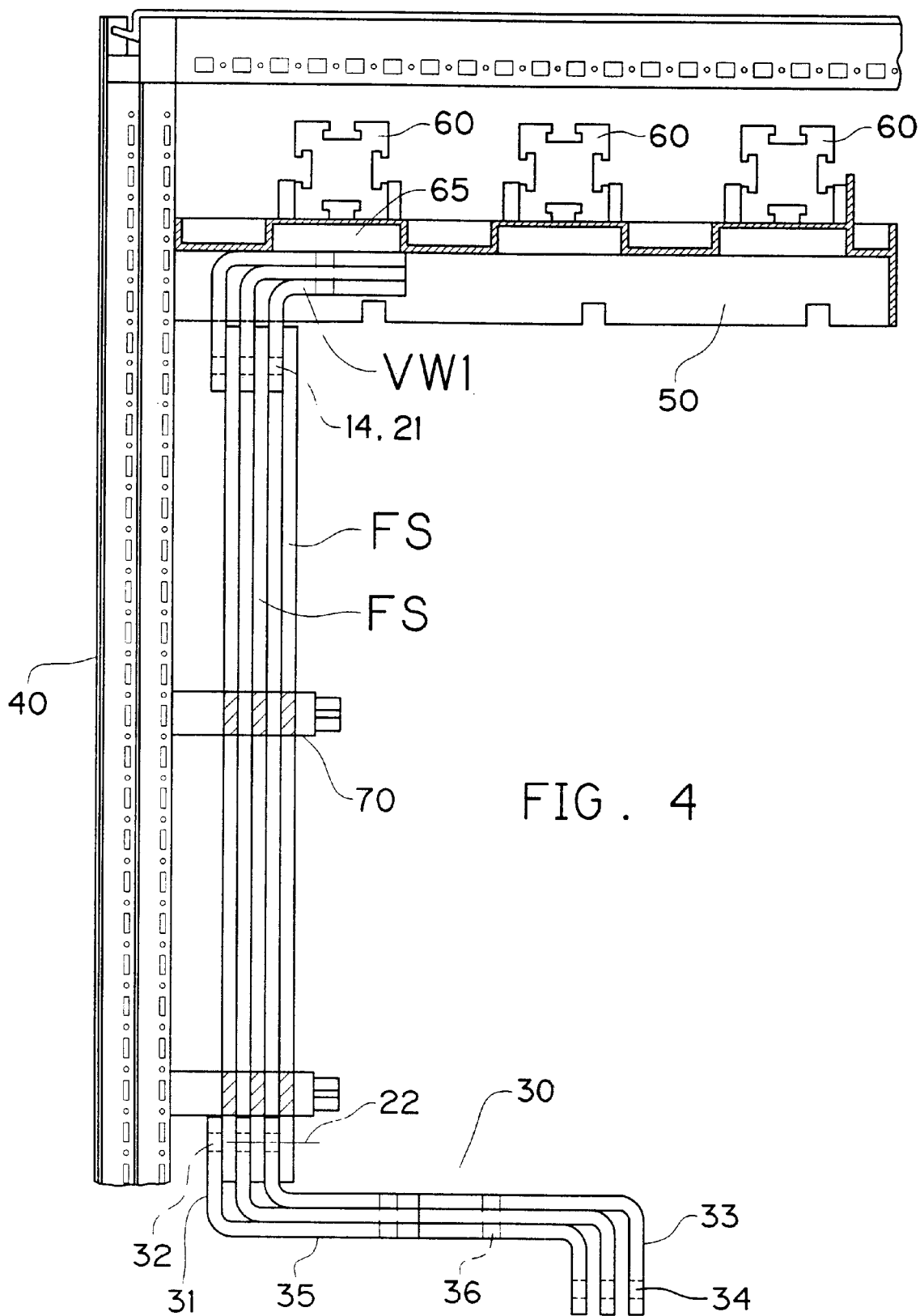
FIG. 4 is a side view of the bus bars installed in a switchgear cabinet.

If, as shown in FIG. 4, three bus bars 60 of a rotary current bus bar system are arranged in a rack 40 in one horizontal plane, the connecting elbow sets VW1, VW2 and VW3, represented in FIG. 1, can be used for connecting the associated bus bar 60. Here, and as shown in FIG. 4, the connecting legs 11 of the connecting elbows 10.11, 10.12 and 10.13 are so long that they can be connected via the fastening bores 12 with the left bus bar 60. With the connecting elbow set VW2, the connecting legs 11 of the connecting elbows 10.21, 10.22 and 10.23 are so long, that they can be connected via their fastening bores 15 with the center bus bar 60 in FIG. 4. Finally, with the connecting elbow set VW3, the connecting elbows 10.31, 10.32 and 10.33 can be conducted to the right bus bar 60 in FIG. 4 and connected with the right bus bar 60 via their fastening bores 16. As shown in FIG. 4, a contact piece 65 with the bus bar 60, which is inserted into an insulation piece 50, is respectively used for this purpose. Thus the connecting legs 11 of the connecting elbow sets VW2 and VW3 can be conducted without contact over the bus bars to which they are not to be connected.

The connecting elbow set VW3 can also be used for connecting all three bus bars 60, if the connecting legs 11 have fastening bores 12, 15 and 16. The insulation pieces 50 extend transversely over all the bus bars 60 and have a receptacle for the contact piece 65 in the area of each bus bar 60. The junction legs 13 of all connecting elbows 10.31, 10.32 and 10.33 can be aligned in one vertical plane with three connecting elbow sets VW3. As FIG. 1 shows, the individual connecting legs 13 in the connecting elbow sets VW1 to VW3 are at preset distances corresponding to a thickness of the flat material being used, so that the flat rail sections 20 in FIG. 2 and/or the junction legs 31 of the angle cleat set ZW in FIG. 3 can be interlockingly connected with each other.

The connecting legs 13 of the connecting elbow sets VW1, VW2 and VW3, the end sections of the flat rail sections 20 of the flat rail set FS, and the junction legs 31 and 33 of the angle cleat set ZW have fastening bores 14, 21, 22, 32 and 34, which are matched to each other and preferably correspond in number and arrangement to the fastening bores of the installation device to be connected.

The connecting elbow sets VW1, VW2 and VW3 can not only be used for connecting the bus bars 60, they can also be included in the same or different orientation in the connection to the installation device. The connection can also take place without the flat rail set FS, or with a flat rail set FS in which the flat rail sections 20 are shorter or longer. The same applies to the angle cleat set ZW in regard to the center leg 35 of the Z-shaped angle cleat 30.

As FIG. 3 shows, the contact plates 40 with the fastening bores 41 are required if the installation device has a connecting contact designed as a flat connecting contact. The spaces between the angle cleats are filled with the contact plates 40 if the flat connecting contact of the installation device is brought into flat contact with all junction legs of the facing elbow set VW, FS or ZW.

In the embodiment of FIG. 4, the bus bars 60 are arranged beneath the cover of the switchgear cabinet, wherein they extend parallel with the rear of the switchgear cabinet and are connected in the area facing the rear and are spaced apart toward the front of the switchgear cabinet. The junction legs of the connecting elbow sets VW1 to VW3, or three times VW3, are spaced a short distance apart from the rear wall and are downwardly extended by the flat rail set FS, wherein the interlocked connection is provided via the fastening bores 14 and 21. In this case the flat rail sections 20 can be maintained spaced apart by means of additional spacers 70.

The lower end of the flat rail sections 20 with the fastening bores 22 can be directly connected with a junction contact of the installation device. However, the connection to the junction contact of the installation device can also be extended by a connecting elbow set VW1, VW2 or VW3 and/or by an angle cleat set ZW.

What is claimed is:
1. In a kit for a bus bar system for connecting bus bars with connectors of an electric installation device, the improvement comprising:
 a plurality of connecting elbows (10.11, 10.12, 10.13, or 10.21, 10.22, 10.23, or 10.31, 10.32, 10.33), a plurality of flat rail sections (20) and a plurality of Z-shaped angle cleats (30) each made from a flat material of uniform cross section;
 the connecting elbows having first connecting legs (11) and second connecting legs (13) connectible with the bus bar (60) wherein in an installed position of connecting elbow sets (VW1, VW2, VW3) the first connecting legs (11) rest on top of each other and the second connecting legs (13) are at a distance from each other which corresponds to a thickness of the flat material; and
 in the installed position of angle cleat sets (ZW) junction legs (31 or 33) of the Z-shaped angle cleats (30) are at the distance from each other, which corresponds to the thickness of the flat material.

2. In the kit in accordance with claim 1, wherein there is an equal number of each of the connecting elbows (10), the flat rail sections (20) and the Z-shaped angle cleats (30).

3. In the kit in accordance with claim 2, wherein the connecting elbows (10.11, 10.12, 10.13, or 10.21, 10.22, 10.23, or 10.31, 10.32, 10.33) for the bus bar system with a plurality of spaced apart ones of the bus bars (60) have the first connecting legs (11) of different lengths matched to a second distance between the bus bars (60) and with connecting bores (12, or 15, or 16) associated with the bus bars (60).

4. In the kit in accordance with claim 2, wherein with several spaced apart ones of the bus bars (60) for connecting each of the bus bars (60), uniform ones of the connecting elbows (10.31, 10.32, 10.33) are used with the first connecting legs (11) that extend transversely over the bus bars (60) and have associated connecting bores (12, 15, 16) near each of the bus bars (60).

5. In the kit in accordance with claim 4, wherein the second connecting legs (13) of the connecting elbow sets (VW1, VW2, VW3), the flat rail sections (20) and the junction legs (31, 33) of the angle cleat sets (ZW) have fastening bores (14, 21, 22, 32, 34) matched to each other.

6. In the kit in accordance with claim 5, wherein the angle cleat sets (ZW) uniformly have the Z-shaped angle cleats (30) with center legs (35) having connecting receivers (36) for fixing the angle cleat set (ZW) in place in the installed position.

7. In the kit in accordance with claim 6, wherein contact plates (40) are positioned between the angle cleats (30) of the angle cleat set (ZW) which have a second thickness that corresponds to the thickness of the flat material and which can be connected with the junction legs.

8. In the kit in accordance with claim 4, wherein the first connecting legs (11) of one of the connecting elbow sets (VW3) are connectible with an associated one of the bus bars (60) by insulating pieces (50) which receive a contact bow (65) near the associated bus bar which makes an electrical connection between the associated bus bar (60) and one of the connecting elbow sets (VW3).

9. In the kit in accordance with claim 8, wherein flat rail sets (FS) and the flat rail sections (20) have different lengths.

10. In the kit in accordance with claim 9, wherein the angle cleat sets (ZW) with the Z-shaped angle cleats (30) have center legs (35) with different dimensions.

11. In the kit in accordance with claim 1, wherein the connecting elbows (10.11, 10.12, 10.13, or 10.21, 10.22, 10.23, or 10.31, 10.32, 10.33) for the bus bar system with a plurality of spaced apart ones of the bus bars (60) have the first connecting legs (11) of different lengths matched to a second distance between the bus bars (60) and with connecting bores (12, or 15, or 16) associated with the bus bars (60).

12. In the kit in accordance with claim 1, wherein with several spaced apart ones of the bus bars (60) for connecting each of the bus bars (60), uniform ones of the connecting elbows (10.31, 10.32, 10.33) are used with the first connecting legs (11) that extend transversely over the bus bars (60) and have associated connecting bores (12, 15, 16) near each of the bus bars (60).

13. In the kit in accordance with claim 1, wherein the second connecting legs (13) of the connecting elbow sets (VW1, VW2, VW3), the flat rail sections (20) and the junction legs (31, 33) of the angle cleat sets (ZW) have fastening bores (14, 21, 22, 32, 34) matched to each other.

14. In the kit in accordance with claim 1, wherein the angle cleat sets (ZW) uniformly have the Z-shaped angle cleats (30) with center legs (35) having connecting receivers (36) for fixing the angle cleat set (ZW) in place in the installed position.

15. In the kit in accordance with claim 1, wherein contact plates (40) are positioned between the angle cleats (30) of the angle cleat set (ZW) which have a second thickness that corresponds to the thickness of the flat material and which can be connected with the junction legs.

16. In the kit in accordance with claim 1, wherein the first connecting legs (11) of one of the connecting elbow sets (VW3) are connectible with an associated one of the bus bars (60) by insulating pieces (50) which receive a contact bow (65) near the associated bus bar which makes an electrical connection between the associated bus bar (60) and one of the connecting elbow sets (VW3).

17. In the kit in accordance with claim 1, wherein flat rail sets (FS) and the flat rail sections (20) have different lengths.

18. In the kit in accordance with claim 1, wherein the angle cleat sets (ZW) with the Z-shaped angle cleats (30) have center legs (35) with different dimensions.

* * * * *